United States Patent [19]

Smelser et al.

[11] Patent Number: 5,779,298
[45] Date of Patent: Jul. 14, 1998

[54] SUN VISOR, KIT AND METHOD FOR REUPHOLSTERY

[76] Inventors: John L. Smelser; Debbie J. Smelser, both of 5904 Fox Hollow La., Bradenton, Fla. 34202

[21] Appl. No.: 697,374

[22] Filed: Aug. 23, 1996

[51] Int. Cl.⁶ ........................................ B60J 3/00
[52] U.S. Cl. ............................... 296/97.1; 29/91.1
[58] Field of Search ................. 296/97.1; 29/91.6, 29/91, 91.1

[56] References Cited

U.S. PATENT DOCUMENTS

| | | |
|---|---|---|
| 18,323 | 10/1857 | Coffin . |
| 588,244 | 8/1897 | Roberts . |
| 873,901 | 12/1907 | Sauer, Jr. . |
| 1,017,958 | 2/1912 | Cole . |
| 1,499,821 | 7/1924 | Griffiths . |
| 2,140,959 | 12/1938 | Jacobs . |
| 3,302,260 | 2/1967 | Cuddeback . |
| 3,405,969 | 10/1968 | Creel .......................... 296/97.1 |
| 3,421,276 | 1/1969 | LaBarge . |
| 3,661,693 | 5/1972 | Pierson . |
| 3,875,623 | 4/1975 | Johnston . |
| 4,234,035 | 11/1980 | Babbs . |
| 4,337,815 | 7/1982 | Lindstrom . |
| 4,477,116 | 10/1984 | Viertel . |
| 4,982,991 | 1/1991 | Lawassani . |
| 5,031,951 | 7/1991 | Binish . |
| 5,148,588 | 9/1992 | Prillard . |
| 5,230,546 | 7/1993 | Smith .......................... 296/97.1 |

*Primary Examiner*—Gary C. Hoge
*Assistant Examiner*—Jason Morrow
*Attorney, Agent, or Firm*—Charles J. Prescott

[57] ABSTRACT

An upholstered vehicle sun visor and a repair kit and method for reupholstering a vehicle sun visor. The sun visor includes a rigid or semi-rigid inner panel wrapped with, and adhered to, a sheet of flexible padded fabric, the edges of the fabric extending somewhat beyond one side edge of the inner panel. An elongated flexible, preferably plastic rope having an adhesive outer surface is adhered between the extending edges of the fabric and against the inner panel side edge. An elongated flexible hollow trim member, slit or parted along substantially an entire length thereof, is biasingly engaged and held over the rope and extending edges of the fabric to provide a finished appearance. The kit includes the adhesive coated rope and the trim member.

3 Claims, 1 Drawing Sheet

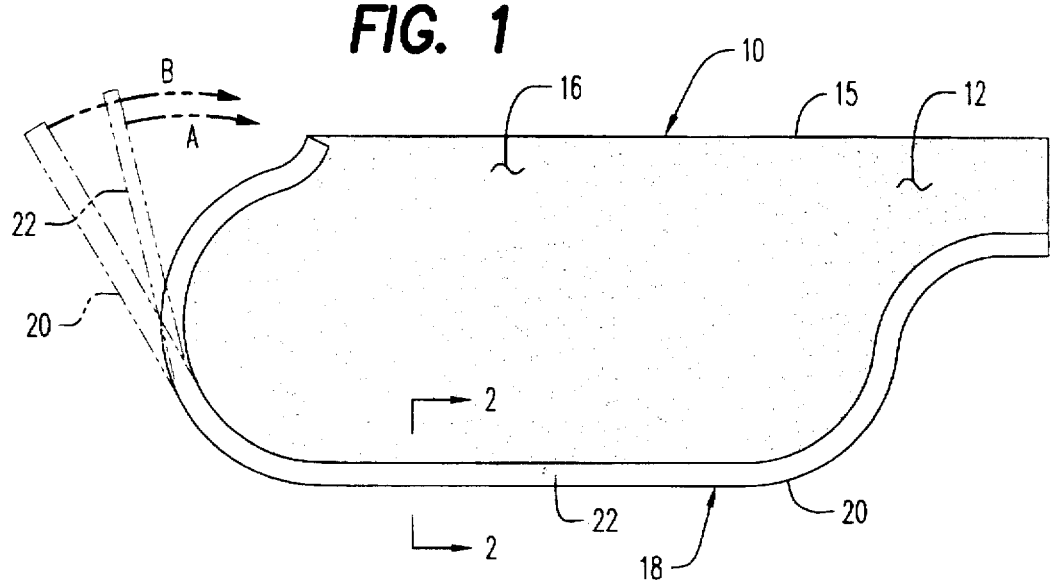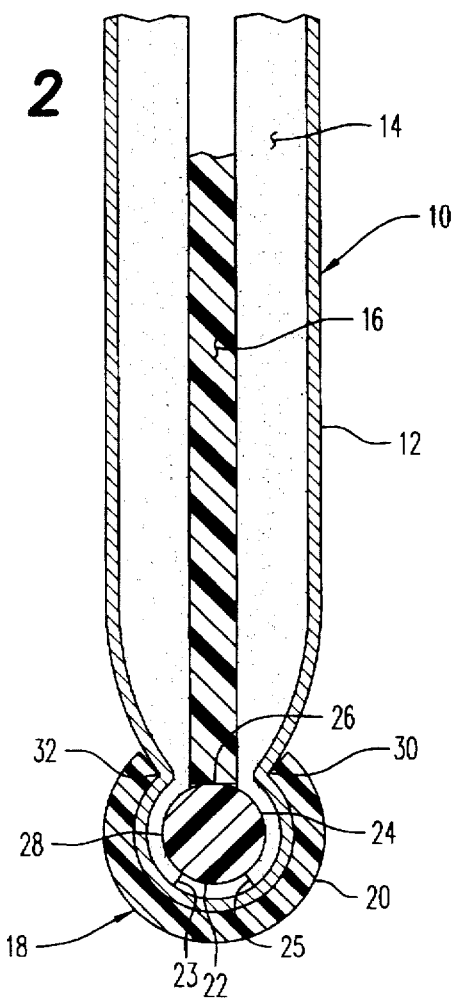

SUN VISOR, KIT AND METHOD FOR REUPHOLSTERY

BACKGROUND OF THE INVENTION

1. Scope of Invention

This invention relates generally to the construction of sun visors for vehicles, and more particularly to an improved vehicle sun visor structure and kit and method for reupholstering a sun visor.

2. Prior Art

Sun visors which will pivot and articulate to various positions within a vehicle are installed into virtually all modern automobiles and trucks. These sun visors are utilized to block direct sunlight from entering the vehicle, and particularly for shielding the driver's and passenger's eyes when sunlight angles are low.

The interior of a vehicle is a particularly hostile environment experiencing temperature swings of from well below zero degrees (0°) to well in excess of one hundred thirty degrees (130°) during periods of non-use. As a result, materials forming the interior of the vehicle are particularly subject to both heat, sunlight and humidity deterioration and may require periodic replacement. The upholstery within the vehicle is particularly sensitive to all forms of this hostile environment and likely requires replacement at least in part, during the typical life of vehicles.

Reupholstering the interior of a vehicle is typically accomplished by either complete replacement of decorative panels and seat covers or by reupholstering by someone skilled in the art. Because replacement parts are exceedingly expensive from vehicle manufacturers on an after-market basis, reupholstery, where appropriate, represents considerable time and money savings to the vehicle owner. One vehicle interior item typically reupholstered rather than being replaced with a new after-market product is the sun visor within the vehicle.

A typical sun visor comprises an inner semi-rigid or rigid panel, preferably of plastic material, which forms the basic structure of the sun visor and provides strength for supporting the connection with the upper body structure of the vehicle. Surrounding this inner panel is a layer of padded fabric having a decorative outer finished fabric surface which is compatible with the rest of the vehicle interior fabric, vinyl, and leather components.

A number of prior art devices are disclosed in the following U.S. patents which teach specific construction for sun visors:

| | |
|---|---|
| Creel | 3,504,969 |
| Viertel, et al. | 4,477,116 |
| Jacobs | 2,140,959 |
| Lawassani, et al. | 4,982,991 |
| Binish | 5,031,951 |
| Smith, et al. | 5,230,546 |

Although not related to sun visors directly, the following U.S. patents teach various means for fabric attachment and decorative finishing as follows:

| | |
|---|---|
| Prillard | 5,148,588 |
| Lindstrom | 4,337,815 |
| Cuddeback | 3,302,260 |
| Coffin | 18,323 |
| Griffiths | 1,499,821 |
| Cole | 1,017958 |
| Sauer, Jr. | 873,901 |
| Roberts | 588,244 |
| Babbs | 4,234,035 |
| Pierson | 3,661,693 |
| Johnston | 3,875,623 |
| LaBarge | 3,421,276 |

Conventional reupholstering of sun visors and the like includes adhering a new layer of padded fabric material around the inner panel, which is generally elongated in configuration, so that the fabric wraps around one of the long margins of the inner panel; however, the fabric must be connected along the other long margin of the sun visor. Accomplishing this connection is typically done by sewing or stitching which requires special equipment and is tedious and timeconsuming at best. At the time of stitching the margins of the new fabric together, typically a vinyl binding strip is attached by stitching around the raw edges of the new fabric which extend beyond the edge of the inner panel enhancing difficulty of sewing.

The present invention provides an economical and easy to manufacture or reupholster sun visor structure along the edge margins of the fabric which does not require stitching or sewing for retention. Attachment of all components is either by adhesion or natural inherent biasing means of the hollow edge trim member which is formed of a hollow elongated member slit or parted along the length of the trim member. When the slit is separated or expanded on installation, the trim member serves to retain itself in position and may also assist in biasingly engaging against both new fabric and behind an inner rope to obviate the need for stitching of the fabric margins together.

BRIEF SUMMARY OF THE INVENTION

This invention is directed to an upholstered vehicle sun visor and a repair kit and method for reupholstering a vehicle sun visor. The sun visor includes a rigid or semi-rigid inner panel wrapped with, and adhered to, an outer sheet of flexible padded fabric, the edges of the fabric extending somewhat beyond one side edge of the inner panel. An elongated flexible, preferably plastic rope having an adhesive outer surface is adhered between the extending edges of the fabric and against and along the exposed inner panel side edge. An elongated flexible hollow trim member, slit or parted along substantially an entire length thereof, is biasingly engaged when expanded along the slit or part at installation and held over the rope and extending edges of the fabric to provide a finished appearance. The kit includes the adhesive coated rope and the trim member.

It is therefore an object of this invention to provide an improved, more economical and easy-to-manufacture structure for a sun visor.

It is another object of this invention to provide a sun visor which includes easily manufactured edge trim which does not require sewing or stitching, rather relying upon adhesive and natural biasing resilience of the hollow slit trim member which forms one decorative edge of the sun visor.

It is still another object of this invention to provide an improved method of construction of a sun visor.

It is yet another object of this invention to provide a kit offering economical means for reupholstering a sun visor without the need for expensive and difficult-to-use sewing equipment.

In accordance with these and other objects which will become apparent hereinafter, the instant invention will now be described with reference to the accompanying drawings.

BRIEF DESCRIPTION OF THE DRAWINGS

FIG. 1 is a plan view of a typical vehicle sun visor of the present invention.

FIG. 2 is a section view in the direction of arrows 2—2 in FIG. 1 and specifically showing the components of a repair kit in accordance with this invention.

FIG. 3 is a view similar to FIG. 2 showing an alternate cross-section structure of the edge-forming kit components in conjunction with the sun visor.

DETAILED DESCRIPTION OF THE INVENTION

Referring now to the drawings, and particularly to FIGS. 1 and 2, the preferred embodiment of the invention is shown generally at numeral 10 (a sun visor assembly), which includes an inner rigid or semi-rigid panel 16 having an overall elongated shape which generally defines the profile of the sun visor 10. A sheet of flexible foam padded upholstery material 12 having an inner foam padding layer 14 is wrapped around the entire inner panel 16 with the flexible fabric 12 being initially wrapped around one typically straight margin 15 of the sun visor 10 and inner panel 16 as shown.

An adhesive (contact cement) is typically applied between the surfaces of the inner panel 16 and the surface of the foam layer 14 to retain the flexible fabric 12 in overall position. After this flexible fabric 12 has been so adhered to the inner panel 16, the remaining margins of the fabric which extend substantially beyond the exposed edge of the inner panel 16 are trimmed. A length of flexible preferably plastic rope 22 having a length generally equal to the exposed edge of the inner panel 16 is coated with an adhesive. An elongated rope or bead 22 as best seen in FIG. 2 is positioned between the extending edges of the fabric 12 which are adhered at 24 and 28 to the surface of the rope 22. The rope 22, preferably flexible plastic, is also adhered to the exposed edge of the inner panel 16 at 26 to firmly secure the rope 22 in the position shown.

The fabric 12 is then trimmed at 23 and 25 so as to remove excess material which may have been initially useful in stretching and positioning the fabric 12 in the position shown. After trimming at 23 and 25, an elongated trim member 20, being formed preferably of plastic tubing having an opaque color generally matching that of the fabric 12 and having a slit or otherwise being parted along substantially its entire length, is biasingly stretched or expanded laterally and forced over the rope 22 and outer attached fabric edge extensions so as to firmly compress the foam 14 and to allow the margins of the slit or parted portion of trim member 22 self-lockingly engage at 30 and 32 against and to compress the fabric 12 and to substantially lockably surround the adhesive rope 22.

By this arrangement, no stitching whatsoever is required to secure and finish the exposed margins of inner panel 16 and fabric 12 during upholstering or reupholstering of the sun visor 10. Adhesion at surfaces 24, 26 and 28 secures the relationship between the exposed edge of the inner panel 16, the rope 22 and the partially surrounding extended margins of the fabric 12. The trim member 20, biasingly fitted into the position shown, completely conceals this underlying construction, including the cut margins 23 and 25 of the fabric 12 and any exposed portion of the rope 22.

As a preferred alternative to the above sequence of upholstering or reupholstering a sun visor using the elements hereinabove described, one surface of the inner panel 16 is first adhered to a portion of the inner surface of the foam layer 14. Thereafter, the length of plastic rope 22 is positioned and adhered against the to-be-exposed edge of the inner panel 16 and the immediately adjacent surface of the foam layer 14. Thereafter, the remaining portion of the upholstery material 12 is wrapped around the concealed straight margin of the inner panel 15 and adhered against the opposite surface of the inner panel 16 and the adhesive plastic rope. Trimming of excess fabric along the edge of the plastic rope 22 at 23 and 25 in FIG. 2 is accomplished, after which the elongated flexible slit trim member 20 is installed. By this sequencing, one step of trimming of excess of upholstery material 12 is eliminated.

In an after-market setting, the repair kit for reupholstering an existing sun visor is shown generally at numeral 18 and includes a length of adhesively covered rope 22 and a similarly sized in length trim member 20. Again, the trim member 20 may be either transparent or opaque colored in plastic material to match the fabric 12 begin used for the upholstery of the sun visor 10.

In lateral size and thickness comparison, the rope 22 is preferably thicker than the inner panel and smaller than the overall thickness of the sun visor 10.

In FIG. 3, an alternate embodiment of the invention is shown generally at numeral 40 having similarly structured rigid or semi-rigid inner panel 46 which defines the overall shape of the sun visor and being covered with a flexible fabric material 42 having an inner compressible foam layer 44. The foam layer 44 is adhered to the surfaces of the inner panel 46 at installation as previously described.

In this embodiment 40 of FIG. 3, an alternate edge-securing and finishing structure which also does not require stitching of the fabric margins together is generally shown at numeral 48 and includes a rope 52 having a somewhat rectangular shape with rounded outwardly facing margins as shown. This rope 52, preferably formed of flexible plastic, is adhesively coated for adherence to the exposed edge of the inner panel 46 at 56 and to the extending edges of the flexible fabric 42 at 54 and 58. The fabric 42, after adhesion to the rope 52 at 54 and 58 is then trimmed at 60 and 62 to eliminate excess material.

A molded plastic trim member 50 biasingly snaps into the position shown when spread along its parted length, leaving flanges 64 and 66 which compressibly engage into the foam layer 44 and behind or around the rope 60 as shown. To further secure this arrangement, adhesive contact is made at 60 by forming the edge portion 68 of trim member 50 to substantially match the contour of the exposed surface of the rope at 60 as shown.

Again, an after-market kit 48 for reupholstering sun visor 40 would include the molded plastic trim member 68 in a length more than sufficient to equal the fabric margins of the sun visor after the fabric 42 has been replaced, along with a similarly sized in length rope 52 preferably made of plastic.

Although the preferred cross section shapes of the rope or bead and expandable trim member are shown in FIGS. 2 and 3, nonetheless other cross section configurations such as a triangular, square, semi-circular and the like are within the intended scope of this invention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A kit for connecting, decorating, and finishing common edge margins of fabric used to reupholster a sun visor of a vehicle, comprising:

an elongated length of flexible rope, substantially as long as a length of the edge margins and having a thickness somewhat smaller than a thickness of the sun visor, said rope having an outer coating of adhesive for attaching said rope between the fabric edge margins which extend beyond an edge of a rigid or semi-rigid panel of the visor covered by the fabric;

an elongated hollow flexible trim member having a length similar to that of said rope and slit or parted along substantially its entire length, said trim member adapted to biasingly engage over and conceal said rope and fabric edge margins attached to said rope.

2. A kit as set forth in claim 1, wherein:

said trim member is adapted for contact and adhesive engagement with said rope.

3. An upholstered sun visor for a vehicle, comprising:

a rigid or semi-rigid elongated inner panel having side edges which define an overall shape of said sun visor;

a single sheet of flexible decorative padded fabric which substantially completely covers and is adhered to said inner panel, maturing edge margins of said fabric extending together beyond substantially one said side edge of said inner panel;

an elongated length of thin, flexible rope having a thickness greater than a thickness of said inner panel and less than a thickness of said sun visor, said rope having an outer coating of adhesive whereby said rope is held between said mating edge margins and against said side edge of said inner panel;

an elongated hollow flexible resilient trim member slit or parted along substantially its entire length whereby said trim member is biasingly engaged over and conceals said rope and said mating edge margins edges.

* * * * *

UNITED STATES PATENT AND TRADEMARK OFFICE
CERTIFICATE OF CORRECTION

PATENT NO. : 5,779,298
DATED : July 14, 1998
INVENTOR(S) : John Smelser and Debbie Smelser It is certified that error appears in the above-indentified patent and that said Letters Patent is hereby corrected as shown below:

Column 6, line 6, replace "maturing" with -- mating --.

Signed and Sealed this

Fifteenth Day of September, 1998

Attest:

BRUCE LEHMAN

*Attesting Officer*  *Commissioner of Patents and Trademarks*